March 31, 1959     B. L. THOMAS     2,879,858
BATTERY ENERGIZED, MOTOR-DRIVEN VEHICLE
Filed Sept. 13, 1954     2 Sheets-Sheet 1
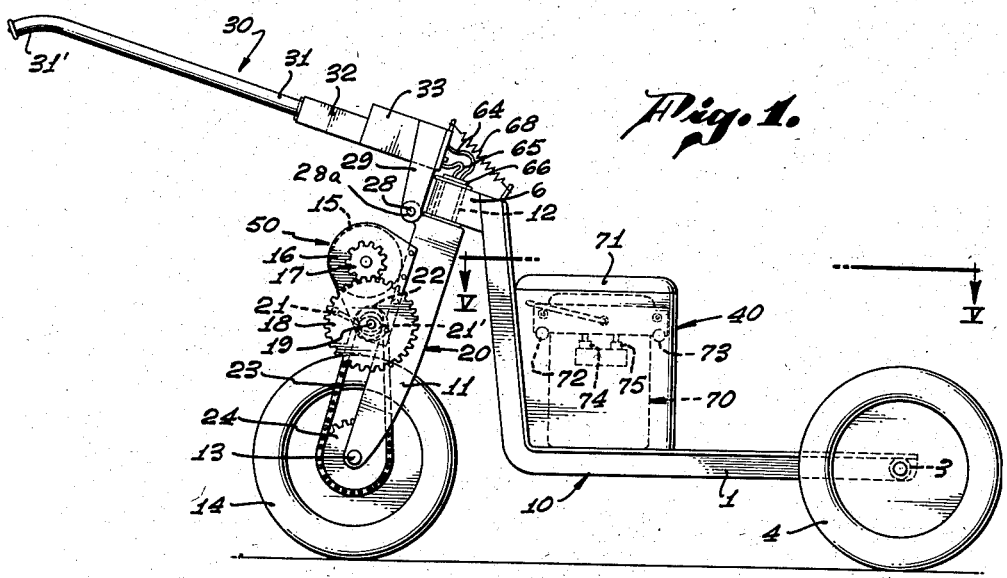
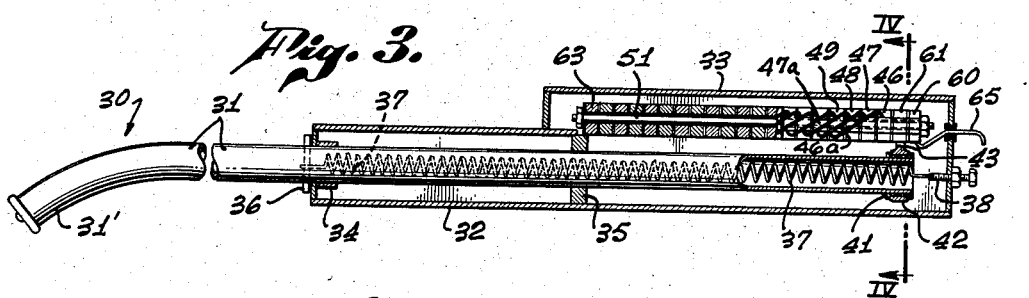
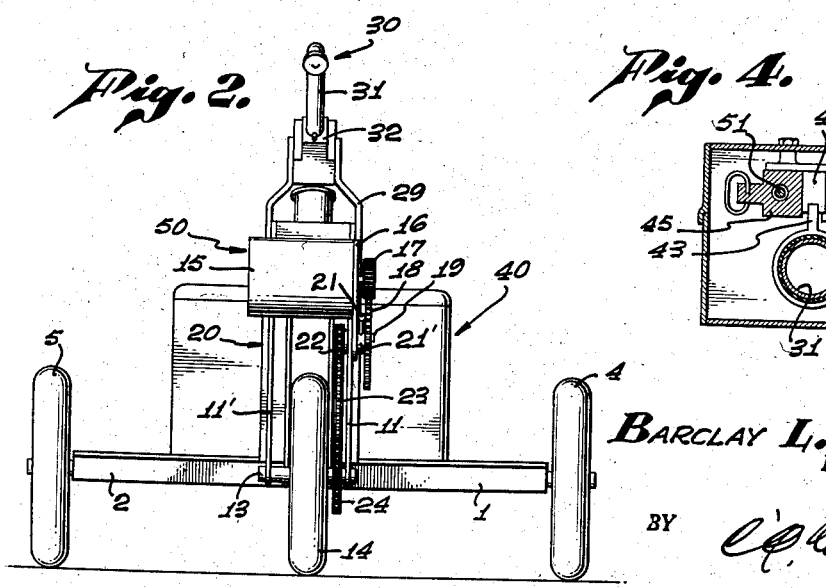
BARCLAY L. THOMAS,
INVENTOR.
BY 
ATTORNEY.

March 31, 1959 B. L. THOMAS 2,879,858
BATTERY ENERGIZED, MOTOR-DRIVEN VEHICLE
Filed Sept. 13, 1954 2 Sheets-Sheet 2

BARCLAY L. THOMAS,
INVENTOR.

BY

ATTORNEY.

United States Patent Office

2,879,858
Patented Mar. 31, 1959

2,879,858

BATTERY ENERGIZED, MOTOR-DRIVEN VEHICLE

Barclay L. Thomas, Los Angeles, Calif., assignor of seventeen-twentieths to George W. Olson, Los Angeles, Calif.

Application September 13, 1954, Serial No. 455,657

5 Claims. (Cl. 180—19)

This invention relates to battery energized, motor-driven vehicles, particularly adapted to transport golf bags, groceries and light loads at a variable speed. Among the numerous improvements embraced by the present invention are control means included within the handle of the vehicle whereby the amount of current supplied to the motor is automatically varied in accordance with the tension applied to the handle in the desired direction of movement as well as means whereby the handle can be rotated, raised or lowered without affecting its operation. Moreover, the invention contemplates a construction and arrangement of parts whereby the energy of a battery is most economically utilized, the guiding of the vehicle is facilitated and the insertion and removal of the battery is greatly expedited.

Although battery energized, motor-driven vehicles have been constructed heretofore, none of them have had those characteristics which permit their use on golf courses or by individuals who need walk at different rates of speed stopping repeatedly and changing direction frequently as, for example, shoppers in a large market. Furthermore, the vehicle for the purposes contemplated by this invention should be light in weight, easily maneuverable and easily maintained in operative condition. Normally, wet batteries are heavy and a number of batteries need be employed; the present invention is directed to a vehicle which need use but a single battery thereby materially reducing the weight, means being provided whereby the current is utilized economically and effectively thereby permitting a single battery to be used for a long period of time without recharging.

Moreover, the present invention relates to a vehicle provided with a handle which controls the direction of movement of the vehicle and includes spring-biased means which automatically vary the current supplied to the motor in accordance with tension applied to the handle. As a result, it is not necessary to operate switches, quadrants or other control devices; the operator simply grasps the handle and pulls thereon very slightly in the desired direction of movement; the vehicle follows the handle, current being supplied to the motor in quantity only sufficient to continue the maintenance of a minimum tension on the handle. If the operator stops, the vehicle catches up to the handle within four or five inches of travel and automatically stops, since the handle includes means which disconnect the current supply to the motor when tension does not exist. In actual operation, the vehicle follows its operator with much less difficulty to the operator than that encountered when one leads a dog.

An object of the present invention, therefore, is to disclose and provide a novel battery energized, motor-driven vehicle particularly adapted for use in transporting golf bags, groceries and light loads at variable speeds.

A further object of the invention is to disclose and provide a motor-driven, battery energized vehicle including a control handle containing spring-biased means normally disconnecting the battery and equipped to automatically vary the amount of current supplied from the battery to the motor in accordance with the tension applied to the control handle.

Again, an object of the invention is to disclose and provide a simple and economical construction for a battery energized, motor-driven vehicle whereby guiding of the vehicle is facilitated and the vehicle can be readily moved in the event a battery is discharged.

Furthermore, it is an object of the invention to disclose and provide means and constructions whereby batteries may be readily placed and withdrawn from a vehicle.

These and various other objects, advantages, modifications and adaptations of the invention will become apparent to those skilled in the art from the appended drawings illustrating an exemplary form of vehicle embodying the improvements and inventions embraced by this disclosure.

In the drawings:

Fig. 1 is a side elevation of a light-weight, three-wheeled vehicle particularly adapted for use on golf courses and the like.

Fig. 2 is a front elevation thereof.

Fig. 3 is an enlarged, partially sectional view of one form of control handle.

Fig. 4 is a transverse section taken along the lines of plane IV—IV in Fig. 3.

Figure 5:
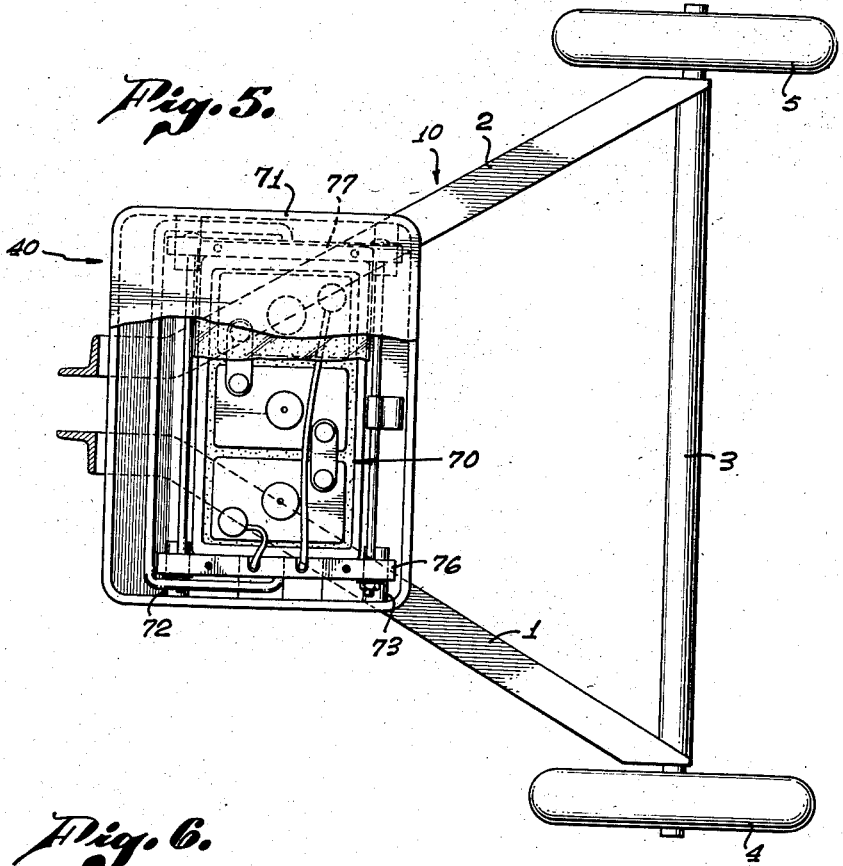
Fig. 5 is a plan view taken on line V—V of Fig. 1, part of the battery cover being removed.
Figure 6:
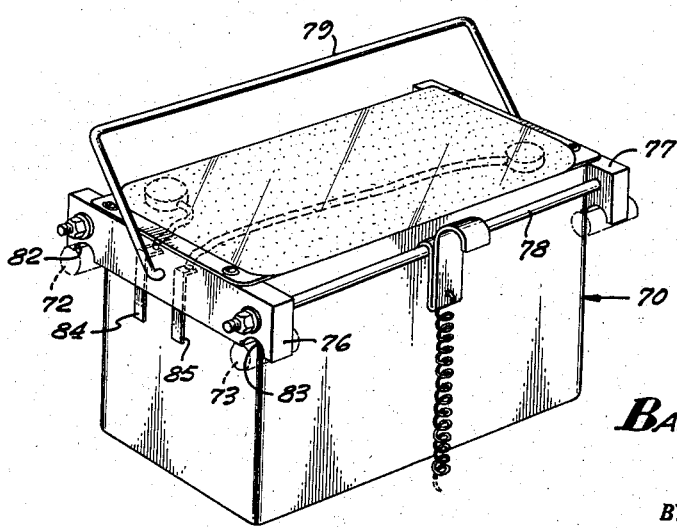
Fig. 6 is a perspective view of means carried by the battery for facilitating its placement in the vehicle and in a charging rack.

The exemplary form illustrated in the drawings comprises a frame or body portion generally indicated at 10, a forked yoke generally indicated at 20, a control handle 30 and a battery housing 40, the motor unit and drive generally indicated at 50 being carried by the yoke or fork 20.

The frame may comprise a pair of angle iron members 1 and 2 having horizontally disposed, rearwardly diverging bottom portions terminating in a rear, transverse, tubular member 3 containing a rear axle upon which the rear wheels 4 and 5 are mounted, each of the members 1 and 2 having an upwardly inclined portion joining together at a collar 6. Any suitable type of floor, cage, rest, support, basket or the like may be carried by the horizontal portions of the angle iron members 1 and 2 of the frame 10.

The forked yoke 20 is preferably provided with two downwardly and forwardly inclined arms 11 and 11' spaced apart a suitable distance, the upper ends of such arms being interconnected and carrying an upstanding, hollow pivot pin 12 adapted to be received in a cylindrical bushing carried by the collar 6. The entire fork is, therefore, capable of pivotal movement about an upwardly inclined or substantially vertical axis. The lower ends of arms 11 and 11' carry the axle 13 upon which the front wheel 14 is mounted. The fork 20 also carries the entire motor unit and drive 50, the center of gravity of said unit being substantially directly above the axle 13 thereby insuring proper application of weight and effective driving force to the wheel 14.

The motor unit 50 may comprise an electric motor 15 provided with an end plate 16 rigidly connected to the arm 11. The motor shaft may carry a pinion 17 which meshes with a large gear 18 carried by a countershaft 19 mounted in an eccentrically bored collar 21' journalled in the end plate 16. The collar 21' may be provided with a handle 21 whereby the gear 18 may be caused to mesh with the pinion 17 or become disengaged therefrom.

The countershaft 19 also carries a sprocket 22 provided with a chain 23 in engagement with a larger sprocket 24 mounted in the axle 13. It will be evident that pinion 17, gear 18 and sprockets 22 and 24 constitute a speed-reduction drive between the motor 15 and the wheel 14 and that means have been provided for manually disengaging the driving connection.

The forward portion of the yoke 20 is provided with a horizontally disposed bearing sleeve 28 carrying a pivot pin 28a, the ends of the pivot pin being connected to a yoke 29 attached to the handle 30.

As previously indicated, the handle 30 is used to guide the direction of movement of the vehicle and simultaneously automatically control the amount of current supplied to the motor 15, thereby varying the speed of the vehicle in accordance with tension applied to the control handle. When a vehicle of the type illustrated is used on a golf course, many directional changes need be made, the speed of the golfer varies, the inclination of the ground varies and in many instances tough clumps of grass and other inequalities are encountered. These various factors have been taken into consideration in the design of the unit.

As best shown in Figs. 3 and 4, the handle 30 may comprise a hollow tube 31 provided with a downwardly curved hand grip portion 31' (which may be covered with a resilient, rubber-like grip), said tubular element 31 extending into a housing having a lower portion 32 and an upper rearward portion 33. The tubular handle 31 is mounted in a forward bearing sleeve 34 and a centrally disposed bearing 35 carried by the housing. A stop pin 36 may extend through the tubular handle, such stop pin being attached to one end of a biasing spring 37 extending rearwardly and connected to a longitudinal adjustable tension controlling stud 38. It will be evident, therefore, that the handle is biased rearwardly and the amount of tension or bias is capable of adjustment by the stud 38. Moreover, it will be noted that the handle 31 is rotatable about its longitudinal axis so that the position of the hand grip portion 31' need not be changed even though the entire housing 32—33 is partially rotated by reason of the inclination of the vehicle itself.

The rearward end of tube 31 is provided with an insulating bushing 41 upon which there is mounted a ring 42 provided with a finger 43, such finger being in engagement with a contact block 44 movable along one face of a group of contact segments forming a contact bar 45. This contact bar 45 is in effect a rheostat and is preferably composed of a plurality of segments of copper or other readily conductive metal such as rheostat segments 46, 47, 48 and 49, insulated from each other and held in the form of a bar by means of a through draw bolt 51. Positive contact between the sliding contact block 44 and the rheostat bar 45 is maintained by means of a pressure plate 53 which is yieldably urged against the contact block 44 by means of a sinuous leaf spring 54. The rheostat bar 45 may be attached to an insulating frame 55 of channel shape, the spring 54 bearing against an end wall of said channel so as to press the contact strip 53 against the block 44 and bar 45.

A series of multiple paralleled resistance wires connect alternate or other series of blocks or segments, thereby introducing a variable resistance into the circuit. For example, segment 46 may be connected by a resistance 46a to block 49 whereas block 47 is connected by a resistance 47a wire (as illustrated in Fig. 3) to the segment immediately beyond segment 49. It is understood that the contact block 44 is of a width or size adapted to contact two or three adjacent segments of the rheostat bar 45. Moreover, it will be noted that the end segments such as 60 and 61 are not connected to the other segments in any way so that when the sliding contact block 44 is in contact with segments 60 and 61, the circuit is actually disconnected. Cable 64 is connected to the opposite end of the rheostat bar 45 as at 63 whereas the presser strip 53 is connected by cable 65 to the motor 15.

The cables 64 and 65 last referred to are preferably connected to a plug 66 which engages a cooperating plug carried within the hollow pin 12 of yoke 20 (see Fig. 1). The cooperating plug in such hollow pin is electrically connected by conductive cables with a battery 70 contained within the battery housing 40.

It may also be noted that the entire handle assembly 30 is spring-biased as by spring 68 so as to normally cause the hand grip portion 31' to be at a distance of say thirty inches above ground, a height at which a normal person would grasp such handle or hand grip easily. It may be further noted that the spring 37 is of sufficient force to normally maintain the contact block 44 against segments 60 and 61 which are inoperative and with the pin 36 against the housing as shown in Fig. 3. In actual practice it has been found that a spring pressure of about one to two pounds is adequate for proper operation.

The battery housing 40 carried by the frame 10 is preferably provided with a removable cover 71 and contains locating pins 72, 73 and the like at each end for properly positioning the battery 70 therein. The battery housing also includes a pair of electrical jacks 74 and 75 permanently connected by suitable cables not shown to the plug in the hollow pin of the yoke so that the jacks 74 and 75 are connected by cables 64 and 65 with the control means of handle 30.

The battery 70 is preferably provided with a pair of end headers 76 and 77 clamped to the battery as by means of draw bolts 78, one of said headers 76 being provided with electrical contacts 84 and 85 capable of engaging and making contact with jacks 74 and 75 when locating pins 72 and 73 of the battery housing 40 fit into locating notches 82 and 83 of the header 76. The electrical contacts 84 and 85 are permanently connected to the poles of the battery 70. A bail 79 may engage the headers 76 and 77 and be used for rapidly withdrawing, raising or lowering the entire battery into its housing. After the battery has been lowered into the housing and contacts have been automatically made as hereinbefore described, suitable hold-down means or latches may be used for holding the battery in position.

It will be noted that by providing the battery 70 with its locating headers and permanent electric contacts 84 and 85 not only is the installation of the battery facilitated but in addition the recharging of such batteries is also greatly facilitated by providing a charging rack similar in construction to the battery housing 40 (in that it contains locating pins and electrical jacks). The necessity of manually and separately applying connections to the poles of the battery is eliminated.

As previously indicated, the rheostat 45 contained within the handle housing 33 is provided with off and on positions or terminal portions, the spring 37 normally biasing contact 44 into off position. The biasing spring 37 cooperates with the movable contact 44 and the rheostat so as to supply current to the motor in accordance with tension applied to the handle and the voltage of the battery 70. Although the current requirement of the motor 50 is constant, the voltage of the battery drops as it is discharged. By reason of the fact that the spring 37 exerts a low tension throughout its range of movement, the displacement of the handle and the position of contact block 44 with respect to the rheostat bar 45 will vary (at a given and same forward speed of the operator) to permit the same value of current to be supplied to the motor thereby maintaining the same motor and vehicle speed even though the position of the contact differs in view of the partially discharged condition of the battery. In other words, irrespective of the voltage of the battery, the control means will supply desired current to the motor without material difference of the force in tension applied to the handle. It may be said that the spring and rheostat therefore cooperate to maintain a desired motor speed so as to permit the vehicle to readily follow an operator.

In the event the battery becomes fully discharged while the vehicle is in use on a golf course or elsewhere, the driving connection between the motor and the wheel may be manually disconnected by operation of the handle 21, thereby permitting the operator to pull the vehicle freely without the necessity of exerting sufficient force to cause the motor to rotate.

Moreover, it is to be understood that the drawings and example given hereinabove are simply illustrative. In order to facilitate packing and shipment of the entire vehicle, the handle 30 may be made in sections, the arrangement of housing and rheostat may be materially varied, the motor unit 50, although preferably located on the forward yoke 20, may employ different driving connections and as previously indicated, the location of the battery and the type of carrier used upon the frame 10 may be materially changed in accordance with the use to which the vehicle is put.

All changes and modifications coming within the scope of the appended claims are embraced thereby.

I claim:

1. A self-regulating variable speed control means for a follower vehicle including electrically controlled drive means for matching the speed of a vehicle with the speed of an operator leading the vehicle, comprising in combination: a control handle having a free distal end portion adapted to be grasped to move the vehicle and an end portion proximate to the vehicle; means on said vehicle connected with the proximate end portion of the handle for movement of the handle sidewise and up and down with respect to the vehicle; a rheostat means carried by the handle connecting means including a plurality of rheostat segments adapted to be connected with the electrically controlled drive means for varying current thereto; means connected to the proximate end portion of the handle for biasing the control handle in a direction opposite to the direction of movement of the vehicle; means on said connecting means for slidably mounting the handle for movement of the handle in the direction of movement of the vehicle and relative thereto; and means including a contact element at said proximate end portion interconnecting the handle and the rheostat means whereby a force applied to the handle in the desired direction of movement of the vehicle varies the position of the contact element relative to said rheostat segments whereby current is automatically varied in response to the applied force on the control handle to cause the vehicle to automatically vary its speed.

2. In a battery energized, motor-driven follower vehicle for transporting golf bags, groceries, and light loads at a variable self-regulated speed, the provision of: a frame provided with a forked yoke mounted for pivotal movement with respect to said frame upon an upwardly inclined axis, said forked yoke being provided with a guiding and supporting wheel; a motor carried by said yoke; a driving connection between said motor and wheel; a battery carried by the frame; conductive means connecting the battery to said motor including a single forwardly extending control handle connected with said yoke to turn said yoke about said axis to vary direction of movement of the vehicle, rheostat means operatively associated with said handle, means for mounting said handle for longitudinal axial movement of the handle relative to said rheostat means to automatically vary current supplied to the motor from the battery in accordance with movement of said handle in response to a pulling force in a desired direction of movement; and manually operable means comprising an eccentrically mounted collar carried by the yoke for disengaging said driving connection.

3. In a follower vehicle for transporting light loads at variable self-regulated speed and including a wheeled frame provided with a battery, a motor having a driving connection with at least one of the wheels of the frame and conductive means between the battery and motor, the provision of: a forwardly extending handle housing connected with the frame for pivotal movement about a horizontal axis, a rheostat carried by the handle housing and forming a part of said conductive means, said rheostat including segments arranged longitudinally of the housing and having off and on positions; a handle within the housing and extending longitudinally therefrom; means for axially slidably mounting the handle in said housing; said handle being provided with a contact element cooperating with said rheostat segments; spring means normally biasing said handle and contact element into off position, said biasing spring and rheostat cooperating to supply current to the motor in accordance with variation in tension applied to the handle and in voltage of the battery; said driving connection including manually operable means comprising eccentric means carried by said frame at said one wheel and a drive gear cooperable with said eccentric means for interrupting said driving connection from said motor to said one wheel.

4. In a battery energized, motor-driven follower vehicle for transporting golf bags, groceries, and light loads and adapted to trail an operator at a pace substantially consonant with that of the operator in response to a pull exerted upon it by the operator, the combination of a wheeled frame, a forked yoke pivotally mounted on said frame and provided with a supporting wheel and a guiding handle; a motor carried by said yoke; a driving connection between said motor and the yoke carried wheel; a battery carried by the frame; conductive connections between the battery and motor, and motor control means carried by said handle and interposed in said conductive connections, said motor control means including a rheostat and a contact element cooperating with said rheostat, said handle having two relatively axially movable parts one of which carries said rheostat and the other of which carries said contact element to thereby, upon relative movement of said handle parts responsive to the pull thereon, automatically vary current supplied to the motor from the battery in response to a pulling force exerted upon said handle in a desired direction of travel of the vehicle; and means for manually effecting engagement and disengagement of said driving connections.

5. A battery energized, motor-driven follower vehicle as claimed in claim 4, wherein said rheostat includes segments arranged substantially longitudinally of said one part, said other part including a free end extending forwardly of the follower vehicle and a portion housed within and longitudinally movable relatively to said one part, said contact element co-operating with and movable longitudinally of and substantially parallel to said rheostat segments.

References Cited in the file of this patent

UNITED STATES PATENTS

| | | |
|---|---|---|
| 753,284 | Maxim | Mar. 1, 1904 |
| 857,797 | Euker | June 25, 1907 |
| 858,658 | Kennedy | July 2, 1907 |
| 892,656 | Euker | July 7, 1908 |
| 1,226,559 | Mason | May 15, 1917 |
| 1,267,742 | Bulley | May 28, 1918 |
| 1,924,851 | Gumpfer | Aug. 29, 1933 |
| 2,138,239 | Irgens | Nov. 29, 1938 |
| 2,327,583 | Framheim | Aug. 24, 1943 |
| 2,417,613 | Radabaugh | Mar. 18, 1947 |
| 2,575,327 | Asbley et al. | Nov. 20, 1951 |
| 2,583,196 | Zander et al. | Jan. 22, 1952 |
| 2,588,664 | Schreck | Mar. 11, 1952 |
| 2,706,008 | Voigt | Apr. 12, 1955 |

FOREIGN PATENTS

| | | |
|---|---|---|
| 467,304 | France | Mar. 27, 1914 |